United States Patent [19]

Sakura et al.

[11] Patent Number: 4,796,096
[45] Date of Patent: Jan. 3, 1989

[54] CIRCUIT FOR PROCESSING COLOR VIDEO SIGNAL

[75] Inventors: Yasuo Sakura; Masao Hara; Tetsuro Nakata; Noboru Fujii, all of Kanagawa, Japan

[73] Assignee: Sony Corporation, Tokyo, Japan

[21] Appl. No.: 106,799

[22] Filed: Oct. 13, 1987

[30] Foreign Application Priority Data

Oct. 17, 1986 [JP] Japan .............................. 61-245510
Oct. 17, 1986 [JP] Japan .............................. 61-245509

[51] Int. Cl.$^4$ .............................................. H04N 9/80
[52] U.S. Cl. .................................. 358/310; 358/316; 358/329
[58] Field of Search .............. 358/310, 315, 316, 318, 358/40, 329

[56] References Cited

U.S. PATENT DOCUMENTS 4,743,977  5/1988  Yoshioka et al. .................. 358/310

Primary Examiner—L. T. Hix
Assistant Examiner—David M. Gray
Attorney, Agent, or Firm—Lewis H. Eslinger

[57] ABSTRACT

In a color video signal processing circuit for use in processing two chrominance component signals produced on the reproduction side of a video tape recorder, in which two chrominance component signals have been time compressed and successively recorded in cyclically repeated fashion as one series of chrominance signal, such a signal is time expanded and made into two series of chrominance signals on the reproduction side. Each of the two series of chrominance signals, i.e., the current signal, and the signal 1H before each are subjected to digital processing for detection of a correlation therebetween and an arithmetical mean value of both the signals is output when there is such a correlation and also the level of the current signal is higher than a reference level, whereas the current signal is output as it is when the level of the current signal is lower than the reference level or when there is no such correlation even if the level of the current signal is higher than the reference level.

7 Claims, 13 Drawing Sheets

▨ RANGE IN WHICH ARITHMETICAL MEAN IS OUTPUT

CIRCUIT FOR PROCESSING COLOR VIDEO SIGNAL

BACKGROUND OF THE INVENTION

1. Field of the Invention

The present invention relates to a color video signal processing circuit suitable for use in processing two chrominance component signals produced on the reproduction side of a video tape recorder (VTR), in which two chrominance component signals are time compressed and successively recorded in cyclically repeated fashion as one series of chrominance signals, and, on the reproduction side, such a signal is time expanded and made into two series of chrominance signals.

2. Description of the Prior Art

Such VTRs that record and reproduce a luminance signal and chrominance signal on separate tracks have so far been known.

An example of the recording system of such VTRs is shown in FIG. 1. As shown in the figure, a video signal output is recorded which constitutes a luminance signal Y and color difference signals R−Y, B−Y.

The luminance signal Y is emphasized for its high frequency portion by a pre-emphasis circuit 1, frequency-modulated into an FM luminance signal $Y_{FM}$ by an FM modulator 2, and supplied through an amplifier 3 to rotating magnetic heads $H_{Y1}$, $H_{Y2}$.

By such heads $H_{Y1}$, $H_{Y2}$, an oblique record track $T_Y$ for each field is formed on a magnetic tape 4 as shown in FIG. 2.

The color difference signals R−Y, B−Y are each compressed in half along the time base by a time base compressor 5 and arranged within one horizontal period in the order of R−Y and B−Y signals as shown in FIG. 3.

The time compressed color difference signal C is emphasized for its high frequency portion by a pre-emphasis circuit 6 and frequency-modulated by an FM modulator 7, and further, the FM color difference signal $C_{FM}$ is supplied through an amplifier 8 to rotating magnetic heads $H_{C1}$, $H_{C2}$. By these heads $H_{C1}$, $H_{C2}$, an oblique record track $T_C$ for each field is formed on the magnetic tape 4 as shown in FIG. 2.

Reference character $P_C$ in FIG. 3C indicates a horizontal synchronizing pulse.

While the luminance signal Y and color difference signals R−Y, B−Y recorded as shown in FIG. 2 are reproduced in the reproduction system in the sequence reverse to that in the recording system, since the color difference signals R−Y, B−Y have been compressed along the time base, their time base is expanded doubly in the reproduction system.

The time base compressor 5 in the recording system shown in FIG. 1 is constituted of four charge coupled devices (CCDs) having capacity for a horizontal period (1H). That is, two devices are used for the R−Y signal and two devices are used for the B−Y signals, and the R−Y signal and B−Y signal for 1H are each input to their respective first and second CCDs alternately at intervals of 1H and the compressed color difference signal C is produced with the signal for 1H output at a ½H interval from the output side.

In such a time base compressor 5, if the characteristics of the first and second CCDs used for each of the R−Y signal and the B−Y signal are not identical, there are produced differences in level at intervals of 1H in each of the R−Y signal and the B−Y signal obtained by time base expansion in the reproduction system. Therefore, there has been such a problem that noises inclusive of DC offset are mixed in the signals and changes in hue and lightness are observed in the output of the color demodulating circuit.

Therefore, in order to eliminate the noise including the DC offset component, a comb filter made up of a delay line 9 and an adder 10 as shown in FIG. 4 has so far been in use. The adder 10 is constructed of three resistors of identical resistance values connected in J configuration and adapted to output the mean value of input signals a and b, (a+b)/2.

As is well known, color difference signals have a line correlation. On the other hand, the noise such as DC offset produced at the time of recording due to the CCDs as described above has the frequency component of integer multiple of one-half the horizontal frequency $f_H$, and hence, its phase is inverted each 1H period.

Therefore, when a noise-mixed input signal A as shown in FIG. 5A and the output signal B of the 1H delay line 9 as shown in FIG. 5B are averaged as $$C = \frac{A + B}{2}$$

in the adder 10, the noise inclusive of the DC offset is canceled as shown in FIG. 5C.

However, in the interval where there is no correlation between the input signal A and the output signal B, the level of the output signal of the comb filter, as seen in the waveform C of FIG. 5 at Fr, is decreased to half by the averaging, and at Bk where no input signal A has been present, a chrominance signal at a half level appears.

As a result, there has been such a problem that color level reduction occurs in the reproduced image, specifically at the edges thereof, or color smearing is produced in the vertical direction on the screen.

To solve such problems, there is proposed a circuit as disclosed in Japanese Laid-open Patent Publication No. 61-156993.

A comb filter disclosed in the above publication will be described with reference to FIGS. 6 and 7.

While a chrominance signal supplied from an input terminal IN is applied commonly to a 1H delay line 9, first adder 10, and a subtractor 11, the output of the delay line 9 is applied commonly to the adder 10 and subtractor 11.

The subtractor 11 is adapted to output one-half the difference between two input signals a and b, $$\frac{a - b}{2}.$$

Reference numeral 20 denotes an overall configuration of a clip type correlator made up of an amplifier 12, clipper 13, small-amplitude passing correlator 14, and two clamp circuits 15, 16.

An output signal D from the subtractor 11 having no line correlation is applied to one input terminal 11a of the clip type correlator 20 and supplied to one terminal of the small-amplitude passing correlator 14 through the amplifier 12, clipper 13, and the clamp circuits 15. To the other input terminal of the small-amplitude passing correlator 14, the output signal D is applied through the clamp circuit 16.

The output of the small-amplitude passing correlator 14 and the added output C of the first adder 10 are supplied to a second adder 18 and the added output K appears at the output terminal OUT.

Operations of the arrangement shown in FIG. 6 will be described referring to FIG. 7.

The chrominance signal A input to the input terminal IN (shown in FIG. 7A) is passed through the 1H delay line 9 to be delayed by 1H as shown in FIG. 7B. Therefore, the output C of the first adder 10 becomes as shown in FIG. 7C.

And, the signal obtained by subtracting the signal shown in FIG. 7B from the signal shown in FIG. 7A, as shown in FIG. 7D, is output from the subtractor 11 as the signal D.

The output D of the subtractor 11 amplified by the amplifier 12, and then, its low level portion is cut off by the clipper 13, whereby the signal E as shown in FIG. 7E is obtained.

Correlation between the signal shown in FIG. 7E and the signal shown in FIG. 7D is taken and portions of smaller amplitude are output by the small-amplitude passing correlator 14, and thereby, the signal as shown in FIG. 7J is obtained. The output signal J of the small-amplitude passing correlator 14 and the output C of the first adder 10 as shown in FIG. 7C are added by the second adder 18, whereby the chrominance signal as shown in FIG. 7K is obtained at the output terminal.

It is apparent from the signal shown in FIG. 7K, that a chrominance signal from which noise is eliminated so as not to cause color level reduction and color smearing can be provided by the arrangement of FIG. 6.

However, since analog processing is performed in the arrangement of FIG. 6 and such as glass or CCD is used as the 1H delay line therein, there is the problem that linearity, S/N, frequency characteristic, temperature characteristic, and the like are subject to variation.

An invention to solve such problem has already been proposed in Japanese patent application No. 61-81619.

The above mentioned invention will be described with reference to FIGS. 8 and 9.

In the arrangement as shown in FIG. 8, latch circuits 21, 22 are supplied with chrominance signals converted into digital signals in the reproduction system.

Referring to the figure, the data $R-Y_D$ from a delay circuit 26 is supplied to one input of a switching circuit 30R constituting a dropout compensation circuit 23. The output data $R-Y_{D1}$ of the switching circuit 30R is supplied to a shift register 31R constituting a 1H delay line and the output data $R-Y_{D2}$ of the shift register 31R is supplied to the other input of the switching circuit 30R.

And, while the output data $R-Y_{D1}$ of the switching circuit 30R is supplied to a ROM 32R of a P-ROM, for example, as high-order bits of an address signal, the output data $R-Y_{D2}$ of the shift register 31R is supplied to the ROM 32R as low-order bits of the address signal.

In the present case, at the address in the ROM 32R designated by the output data $R-Y_{D1}$ and $R-Y_{D2}$, there is stored the data $$\{(R-Y_{D1})+(R-Y_{D2})\}/2=R-Y_{D12}$$

when the output data $R-Y_{D1}$ and $R-Y_{D2}$ are judged to be correlative, and the data $R-Y_{D1}$ is recorded when they are judged to be uncorrelative.

The output data of the ROM 32R is latched by a latch circuit 33R and supplied to a D/A converter 24.

The switching circuit 30R is supplied with a dropout pulse Dp from a dropout pulse generator, not shown, when there is a dropout in the chrominance signal. The shift register 31R and latch circuit 33R are supplied with a clock ½R·CK' from a reference clock.

With such an arrangement, when a dropout pulse $D_P$ is not applied to the switching circuit 30R, the current data $R-Y_D$ is output as the output data $R-Y_{D1}$ of the switching circuit 30R, and when the dropout pulse $D_P$ is applied thereto, the data 1H before, $R-Y_{D2}$, is output as the output data $R-Y_{D1}$ of the switching circuit 30R, whereby a dropout is compensated.

From the ROM 32R is read out the data at the address designated by the output data $R-Y_{D1}$ of the switching circuit 30R and the output data $R-Y_{D2}$ of the shift register 31R. That is, when there is a correlation between the output data $R-Y_{D1}$ and $R-Y_{D2}$, the data $$\{(R-Y_{D1})+(R-Y_{D2})\}/2=R-Y_{D12}$$

is read out. This data is the arithmetical mean of the current data $R-Y_{D1}$ and the data 1H before, $R-Y_{D2}$.

And, when there is no correlation between the data $R-Y_{D1}$ and the data $R-Y_{D2}$, the data $R-Y_{D1}$ is read out. This is the current data.

For example, when the output data $R-Y_{D1}$ of the switching circuit 30R varies with time as shown in FIG. 9B (FIG. 9A shows its analog waveform) and the output data $R-Y_{D2}$ of the shift register 31R varies with time as shown in FIG. 9D (FIG. 9C shows its analog waveform), the data from the ROM 32R varies with time for example as shown in FIG. 9F (FIG. 9E shows its analog waveform). In the present example, if the data $R-Y_{D1}$ is [11111101] and the data $R-Y_{D2}$ is [11111111], then they are judged to be correlated and the arithmetical mean value of both the data, [11111110], is output.

The channel for the data $B-Y_D$ in FIG. 8 is arranged similarly to the above described channel for the data $R-Y_D$ and operates in like manner.

Accordingly, with the arrangement of FIG. 8, the correlation is uniformly detected and the pertinent processing is digitally performed by the ROMs 32R, 32B. Therefore, the problem about linearity, S/N, frequency characteristic, temperature characteristic, or the like is resolved.

However, in such a processing circuit of video chrominance signals, whether or not there exists a correlation is judged according to the difference in level $|a-b|$ and an arithmetical mean value is output when the difference in level is less than a predetermined value, and therefore, there arises a problem when the level of the chrominance signal is low.

That is, in the case where the chrominance signal is at a high level, even if a correlation is judged to exist between the current signal and the signal 1H (one horizontal period) before because the difference between their levels is less than a predetermined value, and as a result, the arithmetical mean value $$\frac{A+B}{2},$$

for example, is output, there may arise no problem since the arithmetical mean value is not so much lowered by dubbing. But, if the arithmetical mean value is made to be output in like manner in the case where the chrominance signal is at a low level, the arithmetical mean value is considerably lowered each time dubbing is made, and thereby, such a problem is produced that color at boundary portions becomes lighter and resolution is lowered.

If, for example, signals at a level lower than 5% are judged to be correlated, lowering of the level is produced each time dubbing is repeated, as shown in the following table. As a result, there arises such

TABLE

| Line NO. | No. of Times of Dubbing | | | |
|---|---|---|---|---|
| | 1 | 2 | 3 | 4 |
| n | 0% | 0% | 0% | 0% |
| n + 1 | 0% | 0% | 0% | 0% |
| n + 2 | 5% | 2.5% | 1.25% | 0.625% |
| n + 3 | 5% | 5% | 3.75% | 2.5% | a problem that noise is increased while the level is lowered and irregularity of color becomes conspicuous.

SUMMARY OF THE INVENTION

The present invention is aimed at the provision of a video chrominance signal processing circuit in which the above mentioned problems are solved.

While circuits of the prior art for processing video chrominance signals are adapted such that, when the level of the current chrominance signal and the level of the previous chrominance signal 1H are compared and if the difference in the levels is within the range as indicated by hatching in FIG. 10(a), these signals are judged to be correlative and their arithmetical mean value is output therefrom, the video chrominance signal processing circuit according to the present invention is adapted such that a correlation is not taken if the level of the current chrominance signal is, for example, below L as shown in FIG. 10(b).

According to one aspect of the present invention there is provided an apparatus for reproducing a color video signal from a recording medium on which a luminance component is recorded in a first channel and at least two chrominance component signals are recorded in a second channel such that the chrominance signals are time compressed and successively recorded in cyclically repeated fashion. The apparatus includes time expanding means supplied with reproduced chrominance signals for time expanding the same to generate first and second time expanded chrominance signals, and a pair of signal processing means supplied with the first and second chrominance signals, respectively, each of which signal processing means includes delay means for delaying the input chrominance signal by a horizontal interval to provide a delayed chrominance signal. The apparatus further having adder means for adding the chrominance signal and the delayed chrominance signal to provide an added output, correlation detecting means for detecting the correlation between the chrominance signal and the delayed chrominance signal, level detecting means for detecting the level of the chrominance signal to generate a first output when the level of the chrominance signal is higher than a reference level and generate a second output when the level of the chrominance signal is lower than the reference level. Signal generating means are provided controlled by the outputs of the correlation detecting means and the level detecting means for generating the output signal such that the output signal is equal to the chrominance signal when the level detecting means generates the second output and when the level detecting means generates the first output and the correlation detecting means detects smaller correlation. The output signal is equal to the average level of the chrominance signal and delayed chrominance level when the level detecting means generates the first output and the correlation detecting means detects larger correlation.

DETAILED DESCRIPTION OF THE PREFERRED EMBODIMENTS

Figure 1:
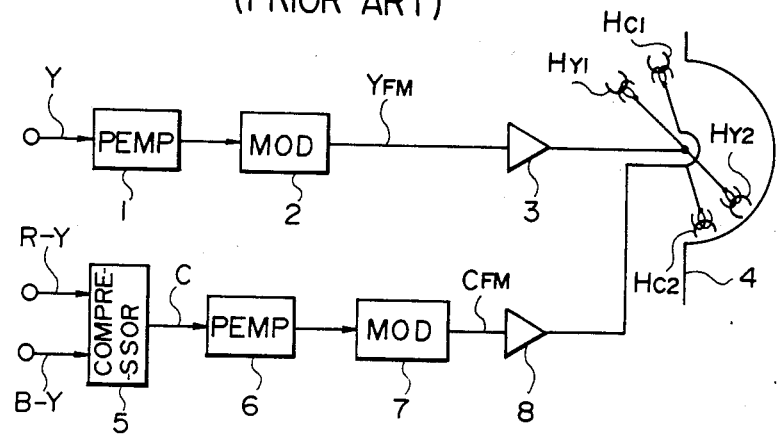
FIG. 1 is a diagram showing a recording circuit in a VTR.
Figure 2:
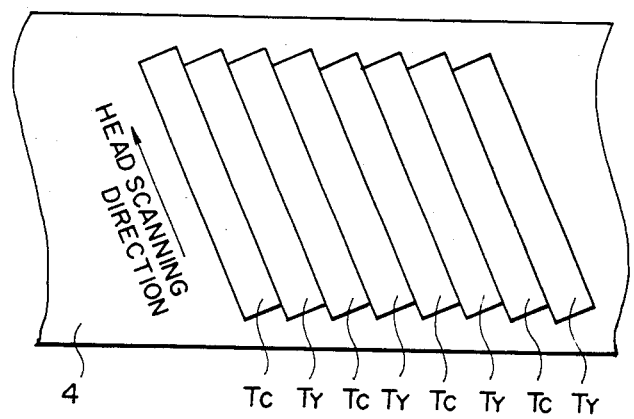
FIG. 2 is an explanatory diagram of record patterns on a tape.
Figure 3:
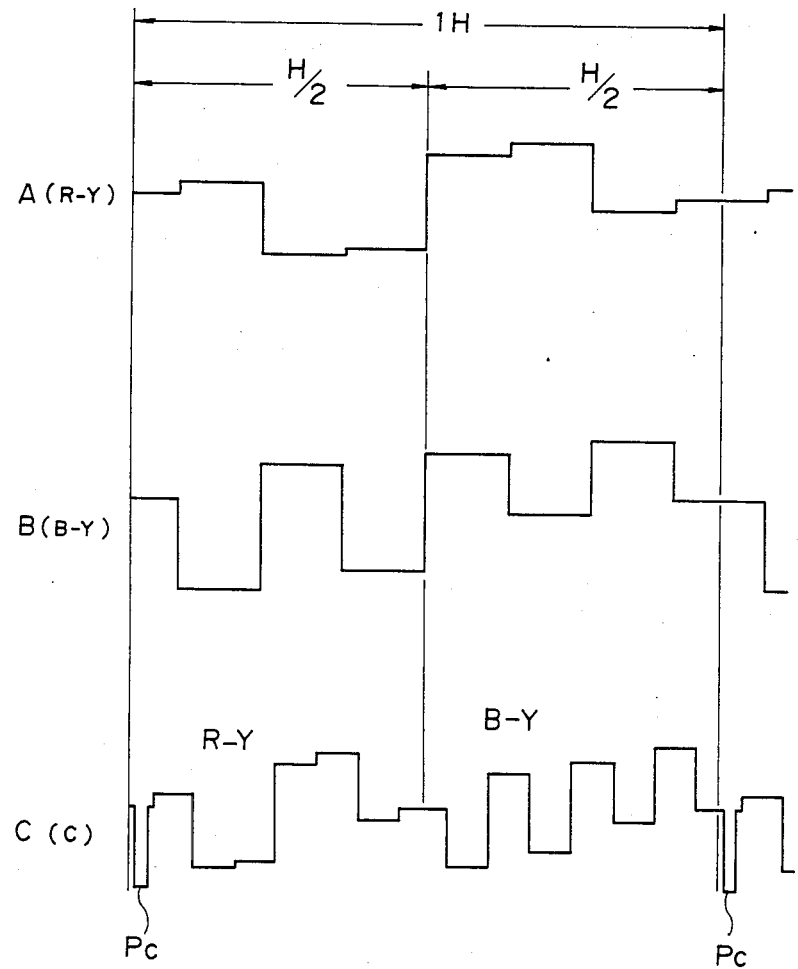
FIG. 3 is a waveform diagram of signals.
Figure 4:
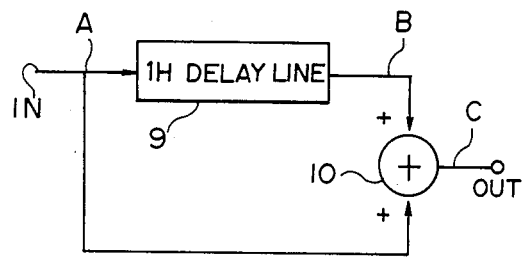
FIG. 4 is a block diagram showing a comb filter.
Figure 5:
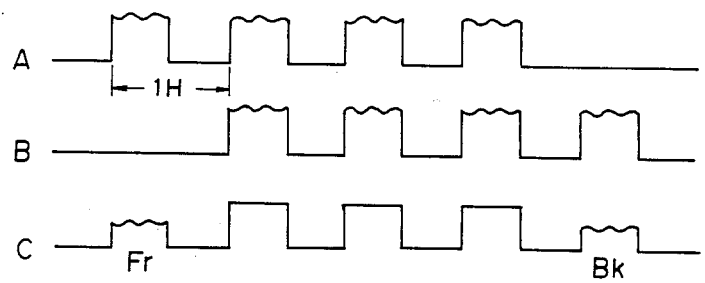
FIG. 5 is a waveform diagram for explaining the principle of the present invention.
Figure 6:
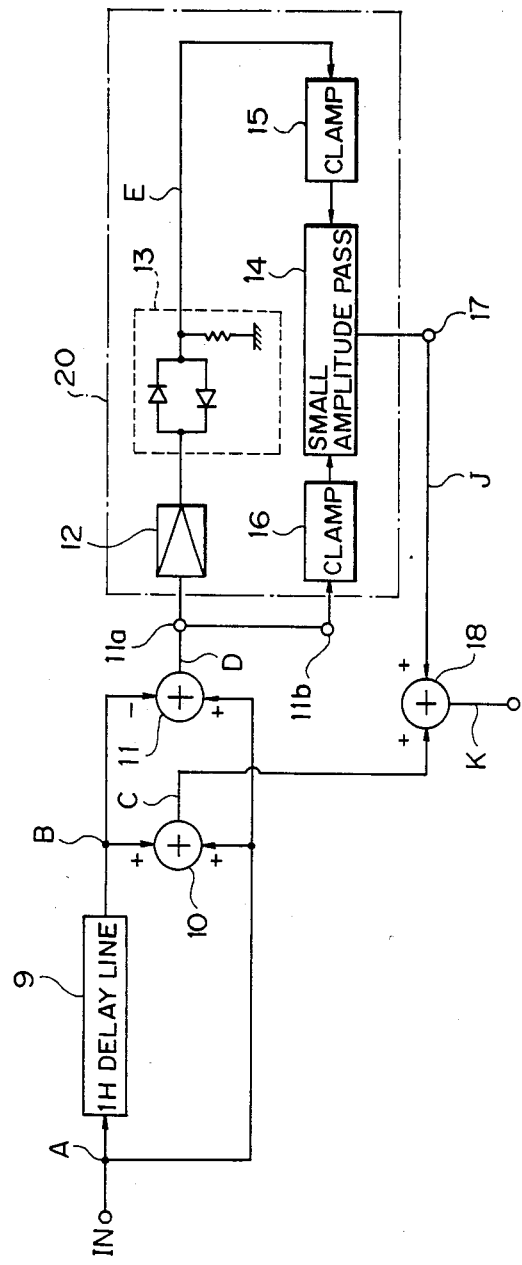
FIG. 6 is a block diagram showing a prior art signal processing circuit.
Figure 7:
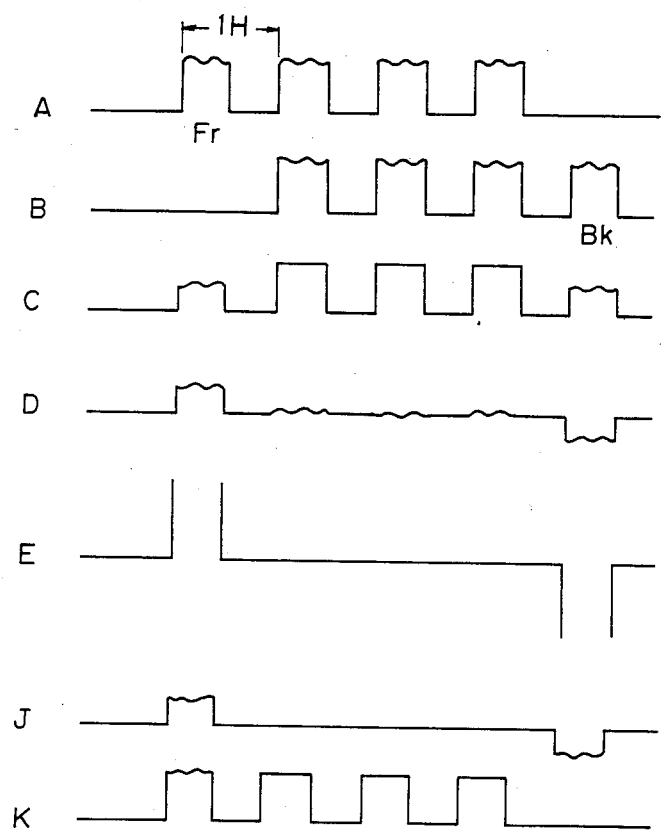
FIG. 7 is a waveform diagram in the arrangement shown in FIG. 6.
Figure 8:
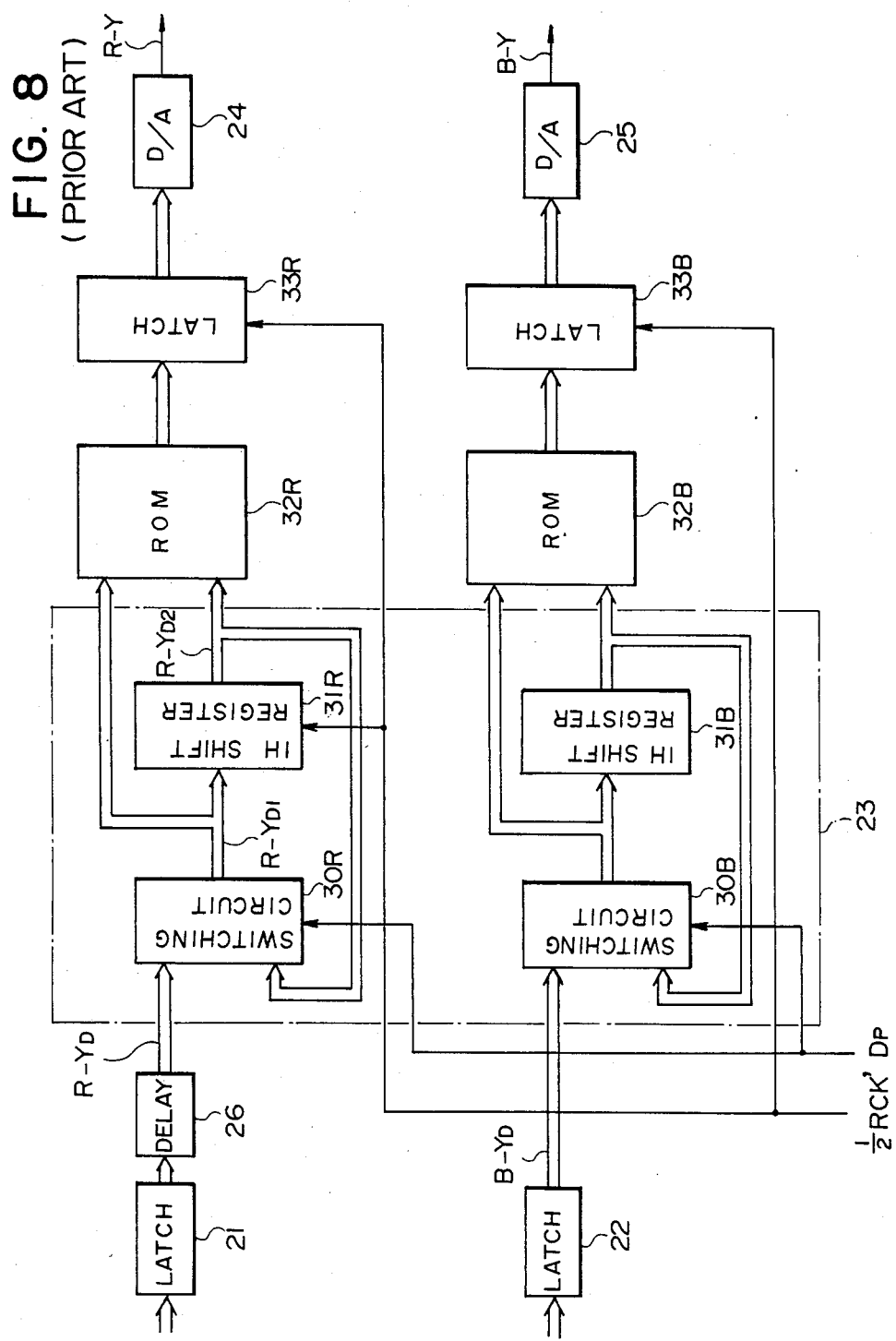
FIG. 8 is a block diagram showing another prior art example.
Figure 9:
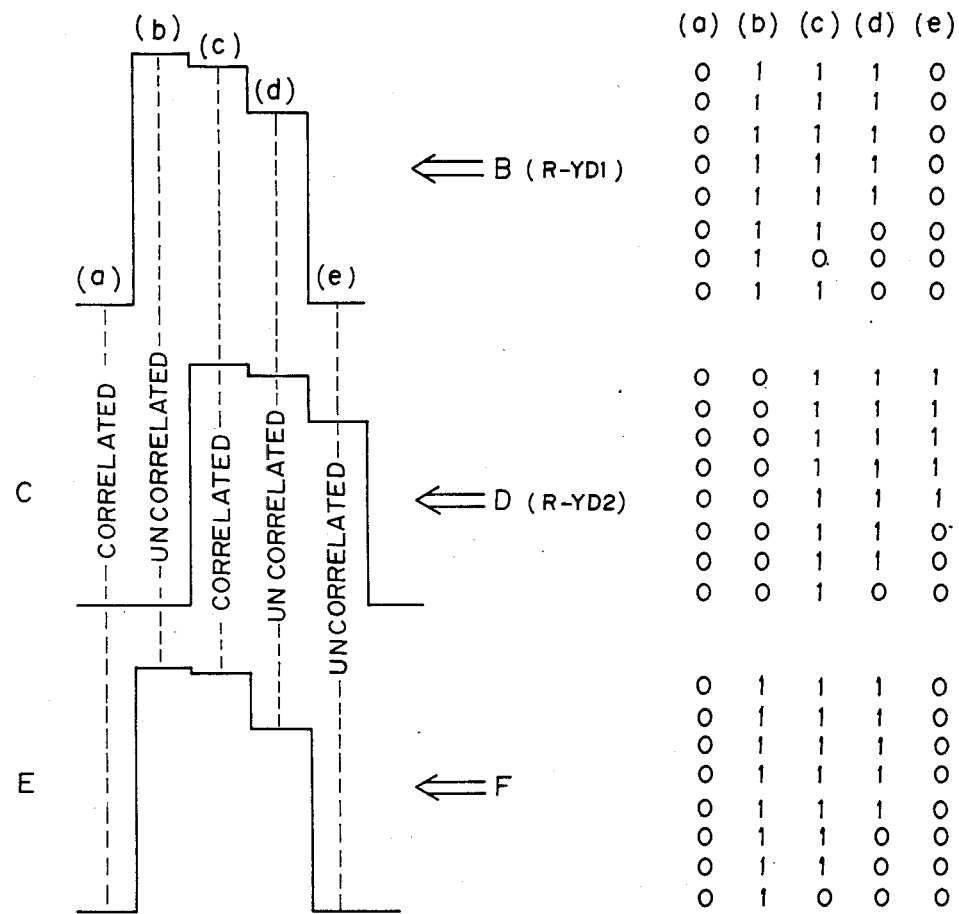
FIG. 9 is a waveform diagram in the arrangement shown in FIG. 8.
Figure 10A:
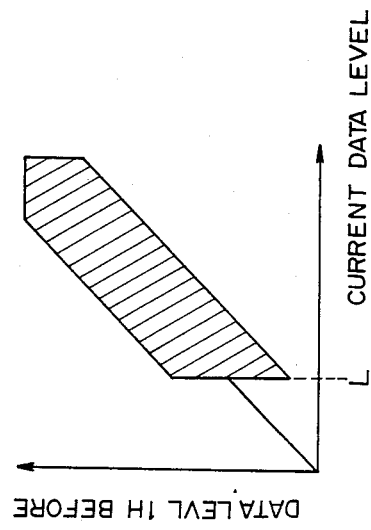
FIGS. 10(a) and (b) are characteristics for detecting correlations.
Figure 10B:
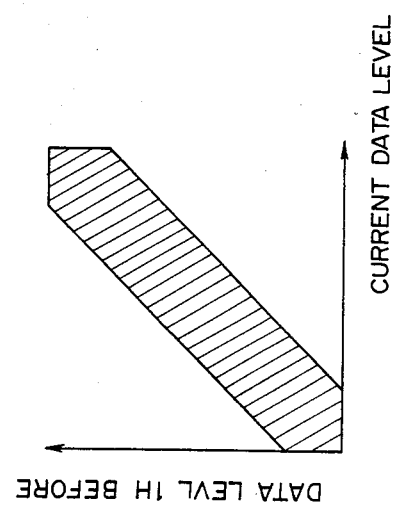

When the video chrominance signal processing circuit has a characteristic as shown in FIG. 10(b), a correlation is not detected if the level is low and the current level is output, and therefore, even if dubbing is repeated, levels of the chrominance signals suffer no change from the original level as shown in the following table.

TABLE

| Line No. | No. of Times of Dubbing | | | |
|---|---|---|---|---|
| | 1 | 2 | 3 | 4 |
| n | 0% | 0% | 0% | 0% |
| n + 1 | 0% | 0% | 0% | 0% |
| n + 2 | 5% | 5% | 5% | 5% |
| n + 3 | 5% | 5% | 5% | 5% |

In this case, the noise such as the D.C. offset that is produced at the time of recording due to nonuniformity in the characteristics of the CCDs is less than 5% at full range, so that, even if the level L is made to be one-fourth the full range, for example, as shown in FIG. 10(b), and the signal processing is performed without detecting the correlation if the signal is below that level, the noise then becomes only about 1%. Therefore, there occurs no problem if such is output directly.

As to chrominance signals at a higher level, noise components can be sufficiently suppressed by means of the comb filter.

Figure 11A:
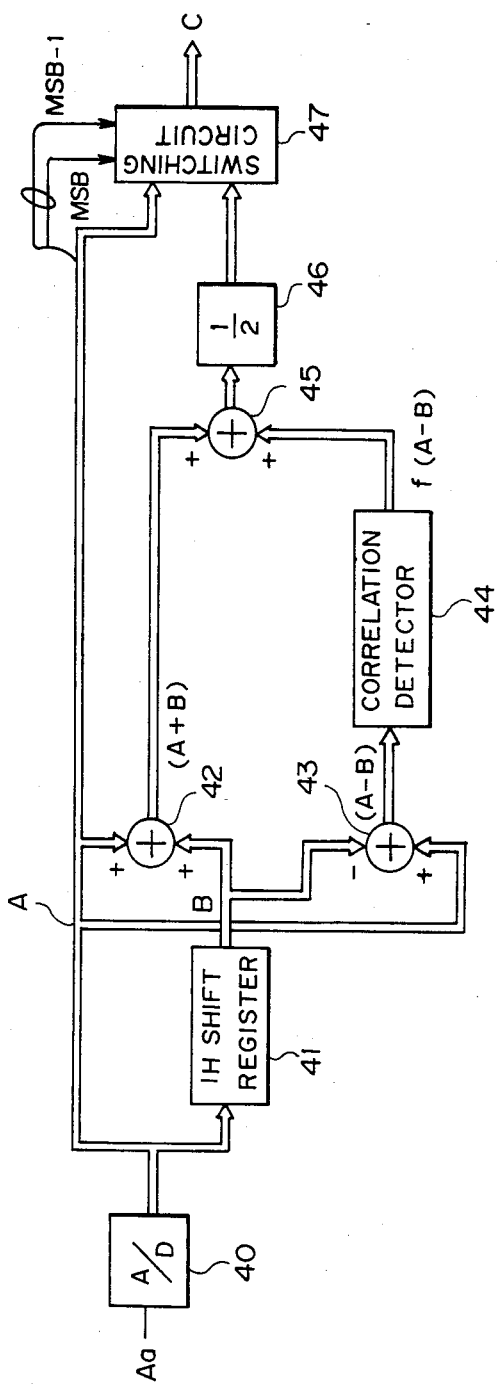
FIGS. 11(a), (b), and (c) are block diagrams showing embodiments of the present invention.
Figure 11:
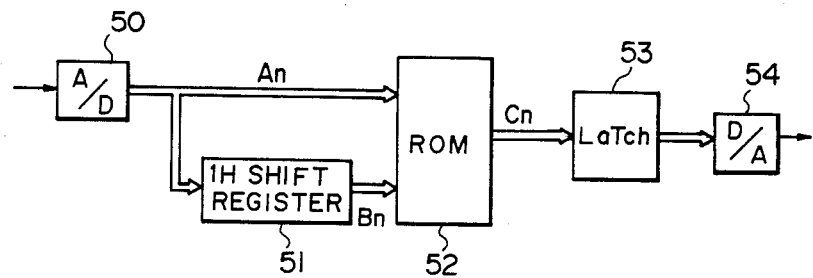

An embodiment of the present invention is shown in FIG. 11(a). Referring to FIG. 11(a), a chrominance signal $A_a$ is converted into digital data A by an A/D converter 40. While the data A is the current data, data B is the data 1H before, which has been passed through a 1H shift register 41.

The current data A is supplied to a first adder 42 and a subtractor 43, and, as first data, to a switching circuit 47. The data 1H before, B, is supplied to the first adder 42 and subtractor 43.

The first adder 42 adds both the data A, B, and supplies the added data (A+B) to a second adder 45. The subtractor 43 calculates difference data (A−B), uncorrelated data of both the data A, B, and supplies the calculated data to a correlation detector 44.

Figure 12:
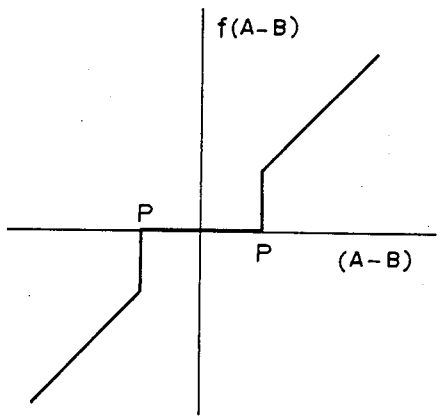
FIG. 12 is a characteristic in correlation detection in the embodiments of FIGS. 11(a), (b), and (c)

The correlation detector 44, when the level of the difference data (A−B) is within a certain range, detects that a correlation exists and outputs data $f(A-B)=0$. When a correlation is detected not to exist, the detector 44 outputs data $f(A-B)=(A-B)$. Such a characteristic of the correlation detector 44 is shown in FIG. 12, in which a correlation is detected to be existent when the difference data (A−B) is within ±P.

The output data f(A−B) of the correlation detector 44 is supplied to the second adder 45. This second adder 45, when both data A, B were judged to be correlated, outputs (A+B) because the output data of the correlation detector 44 then is $f(A-B)=0$, but second adder 45, when both data A,B were detected to be uncorrelated, outputs data 2A because the output data of the correlation detector 44 then is $f(A-B)=(A-B)$ and the calculation $(A+B)+(A-B)=2A$ is made by the second adder 45.

However, since the output data of the second adder 45 is divided by 2 in a divider 46, the data (A+B)/2 being the arithmetical mean of both the data A, B when the data A, B were correlative, or the data A being the current data when the data A, B were uncorrelative, is supplied as second input data to the switching circuit 47.

As the switching signal for the switching circuit 47, high-order two bits, for example, of the current data A are used. The switching circuit 47 is controlled such that, if MSB and the bit second to MSB, MSB−1, as the high-order two bits, are both "0", then the data A is judged to be at a low level less than 25% of the full level and the current data A is directly output, whereas if either MSB or MSB−1 is "1", then the output of the divider 46 is output.

Since the circuit shown in FIG. 11(a) operates as described above, when the level of the chrominance signal is low, the current data A is output regardless of existence or nonexistence of a correlation between the current data and the data 1H before, and therefore, deterioration in color is not caused even if dubbing is repeated.

When the high-order two bits of the data A as the control signal for the switching circuit 47 are both "0", the data A is directly output, and at this time, the level of the data A is lower than 25% of the full level. Therefore, no circuit for generating a specific control signal is required and the configuration can thus be made simpler.

As a matter of course, the level at which the output data of the switching circuit 47 is switched to the data A is not limited to 25% but may be changed at any level according to the need.

FIG. 11(b) shows another embodiment of the present invention, wherein 50 denotes an A/D converter to which a chrominance signal R−Y is input, 51 denotes a 1H shift register, 52 denotes a memory, 53 denotes a latch circuit, and 54 denotes a D/A converter.

In the case of this embodiment, the arithmetical mean value data is adapted to be directly output from the memory 52 constituted of a ROM according to the level data $A_n$ of the current chrominance signal and the level data $B_n$ 1H before.

That is, assuming that the video data are made up of 8 bits, it is adapted such that, when $A_n$ is from [00000000] to [00111111], the data the same as the data of $A_n$ is read out regardless of the value of $B_n$, whereas when $A_n$ is from [00111111] to [11111111], the data whose value is $$\frac{A_n + B_n}{2}$$

is output if $|A_n/B_n|$ is less than a predetermined ratio K (1 dB, for example) and the data the same as the data of $A_n$ is output if $|A_n/B_n|>K$.

The same arrangement is of course provided for the color difference signal B−Y.

Figure 11C:
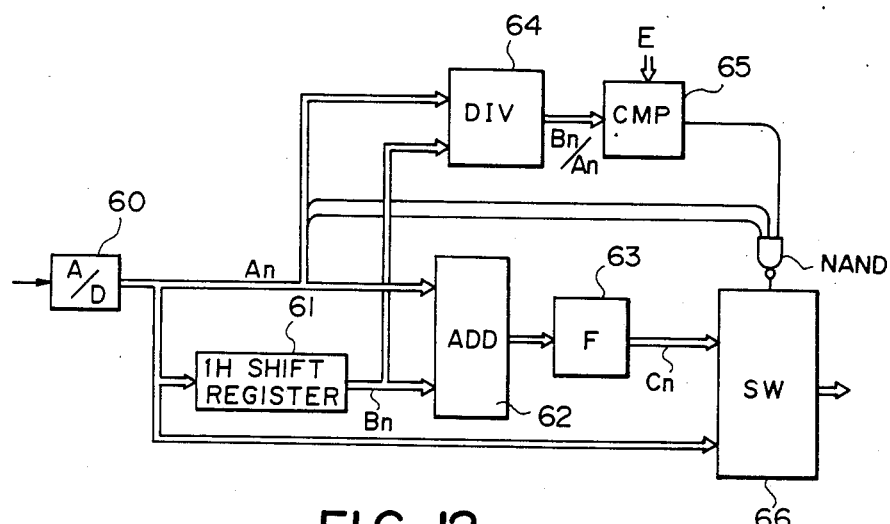

FIG. 11(c) shows a further embodiment of the present invention, wherein 60 denotes an A/D converter, 61 denotes a shift register, 62 denotes an adder, 63 denotes a computing element, 64 denotes a divider, 65 denotes a comparator, and 66 denotes a digital switcher.

In the present embodiment, the same as in the previous embodiment, $A_n+B_n$ is provided by the adder 62 and functional data of $A_n+B_n$, such as $(A_n+B_n)/2$ or $(2A_n+3B_n)/5$, for example, is provided by the computing element 63, and such functional data or $A_n$ is adapted to be selectively output by the digital switcher 66. The criterion for the selection is set up, for example, such that $|B_n/A_n|$ is calculated by the second divider 64 and, when its value is not within $|1\pm\Delta E|$ with reference to a predetermined value E, it is decided that there is no correlation, so that a level "0" is input to the input NAND gate NA and high-order two bits of $A_n$ are also input thereto, whereby the arithmetical mean value data from the computing element 63 is output only when $|B_n/A_n|\approx 1$ and also the level of the chrominance signal is high.

Now, it is to be noted that, when such circuits as described above are operated, the signal processing is executed in two modes, that is, if there is a correlation between the signal 1H before and the current signal, an arithmetical mean value of both the signals is output, and if there is no correlation, the current signal is output as it is. Therefore, there is always produced a difference in level of waveform where one mode of operation is switched to the other.

Figure 13:
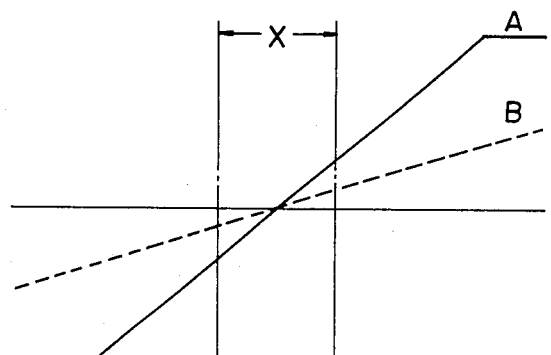
FIGS. 13(a), (b), and (c) are data for describing characteristics of a signal processing circuit of the present invention as shown in FIG. 15.
Figure 13:
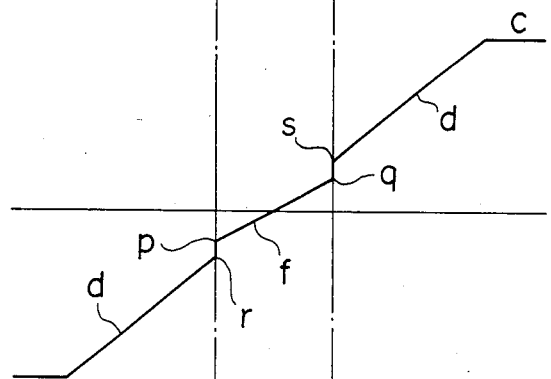
Figure 13:
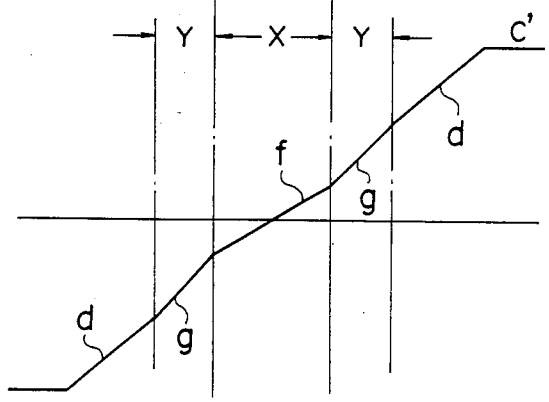

Such situation will be described with reference to FIG. 13.

Showing a variation of the signal 1H before by B in FIG. 13(a) and that of the current signal by A in FIG. 13(a), it is assumed that the range X, for example, is the range of level where the signals are correlated.

Since the current signal A is output as it is in the range outside the range X, the output becomes as indicated by d in FIG. 13(b). Within the range X, since the output is the arithmetical mean of the signal A and signal B, (A+B)/2, the output becomes as indicated by f in FIG. 13(b).

As the level is switched at the point on the boundary between the portion with correlation and the portion without correlation, there are produced some differences in level as seen in the q—s portion and r—p portion in FIG. 13(b).

Such a difference in level causing a distortion in the signal, there has been a problem that a normal chrominance signal is not obtained.

Figure 14:
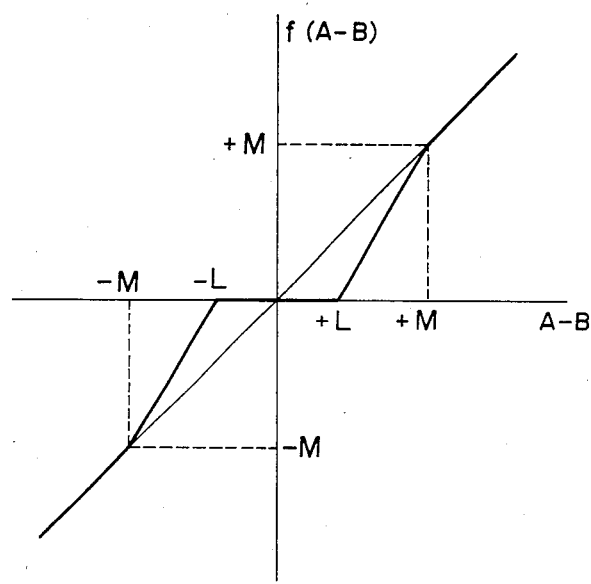
FIG. 14 is a characteristic showing data (A−B) to be output according to degree of correlation.
Figure 15:
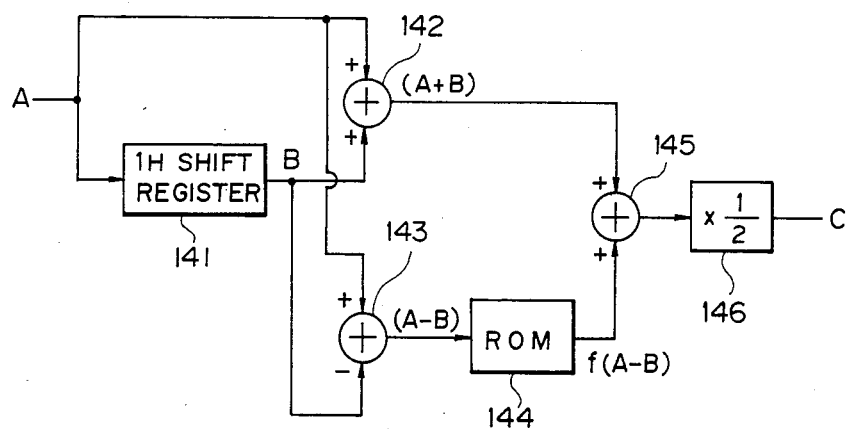
FIG. 15 is a block diagram showing an embodiment of the present invention.

FIG. 15 is a diagram showing an embodiment capable of eliminating the above mentioned difficulty and FIG. 14 is a characteristic of read out data from a ROM 144.

Referring to FIG. 15, input data A is supplied to both a first adder 142 and a 1H shift register 141. Here, the data A has been converted to a digital signal. Data B delayed by the 1H shift register 141 is supplied to the first adder 142 and the added signal of both the data, (A+B), is supplied to a second adder 145.

The difference between the data A and the data B is calculated by a subtractor 143 and the uncorrelated data portion of both the data, (A−B), is supplied to the ROM 144 as an address signal to read out data from the ROM 144. From the ROM 144 as a function generator, a function f(A−B) as shown in FIG. 14 is read out and supplied to the second adder 145.

Accordingly, from the second adder 145, the added output of both the data, (A+B)+f(A−B), is output, which is then divided by 2 by a divider 146 and made into an output signal C. Thus, we obtain $$C = \tfrac{1}{2}\{(A + B) + f(A - B)\}.$$

Now, operations of FIG. 15 will be described.

When the current data A and the data 1H before, B, are in their correlated range (range of the first level difference), the data (A−B) as the output of the subtractor 143 in FIG. 15 is, for example, within the range from −L to L in FIG. 14, and therefore, the read out output f(A−B) from the ROM 144 becomes "0". Since f(A−B)=0, the second adder 145 outputs (A+B), and as the output data C, the data $$\tfrac{1}{2}(A + B),$$

i.e., the arithmetical mean of both the data A, B is output.

In the case where the current data A and the data 1H before, B, are in their uncorrelated range, namely, the range where the output data (A−B) of the subtractor 143 is larger than M in FIG. 14 or smaller than −M (range of the second level difference), the read out output f(A−B) from the ROM 144 becomes, as apparent from FIG. 14, f(A−B)=(A−B).

Accordingly, the second adder 145 outputs (A+B)+(A−B)=2A, and the output data C becomes $$C = 2A \times \tfrac{1}{2} = A,$$

and thus, the current data A is output as the output data C.

Now, the case where the current data A and the data 1H before, B, are in their slightly correlated range, namely, the range where the output data (A−B) of the subtractor 143 is between L and M in FIG. 14 and between −L and −M in FIG. 14 will be described.

When the data (A−B) is between L and M, the read out output from the ROM 144 is, as is apparent from FIG. 14, $$f(A - B) = \frac{M}{M - L}(A - B) - \frac{ML}{M - L}.$$

Accordingly, the added output from the second adder 145 becomes $$(A + B) + \frac{M}{M - L}(A - B) - \frac{ML}{M - L},$$

and thus, the data at the portion g of the characteristic C' shown in FIG. 13(c) is output from the output terminal C.

And, when the data (A−B) is between −L and −M, the read out output from the ROM 144 according to the characteristic of FIG. 14 becomes $$f(A - B) = \frac{M}{M - L}(A - B) + \frac{ML}{M - L}.$$

Accordingly, the added output from the second adder 145 becomes $$(A + B) + \frac{M}{M - L}(A - B) + \frac{ML}{M - L},$$

and the data at the portion g of the characteristic C' shown in FIG. 13(c) is output from the output terminal C.

That is, in the range where the current data A and the data 1H before, B, are slightly correlative (corresponding to the range of Y in FIG. 13(c)), the portion g in FIG. 13(c) is obtained, and therfore, it follows that the arrangement of FIG. 15 outputs the data with a smooth characteristic as shown in FIG. 13(c).

Figure 16:
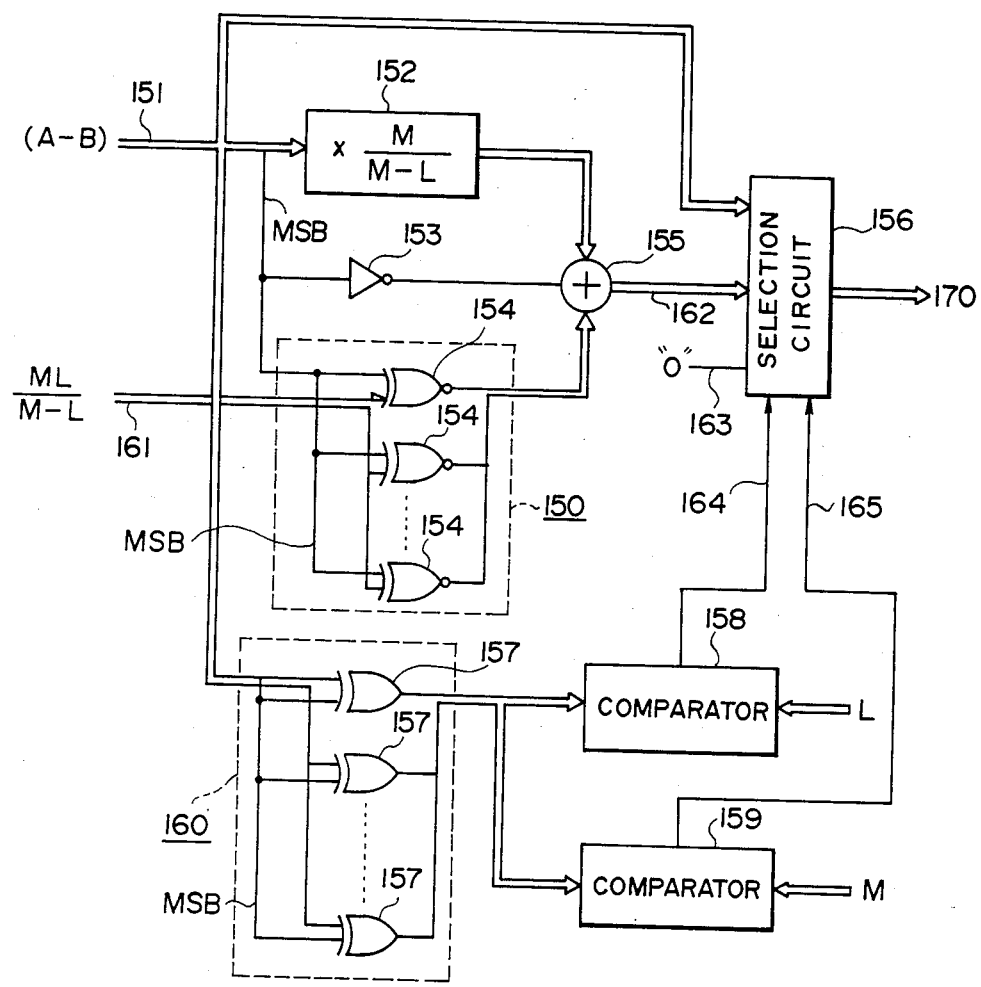
FIG. 16 is a block diagram showing a structure of a portion of FIG. 15.

While the function generator 144 in FIG. 15 is using a ROM and this ROM stores therein the data with a characteristic as shown in FIG. 14, similar interpolation image data can be obtained by using a circuit as shown in FIG. 16 instead of the ROM.

The circuit shown in FIG. 16 will be described below. The difference data (A−B) between the current data A and the data 1H before, B, is supplied to a line 151 and further input to a coefficient multiplier 152, absolute value circuit 160, and, as first input data, to a selection circuit 156. Meanwhile, the MSB bit of the data (A−B), as the sign bit thereof, is supplied to an inverter 153 and a complementing circuit 150. A constant $$\frac{ML}{M - L}$$

is supplied to a line 161 and input to the complementing circuit 150.

The complementing circuit 150 is formed of a parallel circuit of exclusive-NORs (EX-NORs) 154, and since the MSB bit as the sign bit indicating positive or negative polarity of the data (A−B) is supplied to one input terminal of all the EX-NORs 154, only when the data (A−B) is positive, the data of the constant ML/(M−L) is inverted by the complementing circuit 150 and supplied to the adder 155. Meanwhile, the MSB bit is inverted by the inverter 153 and supplied to the adder 155. That is, the output of the complementing circuit 150 and the output of the inverter 153 are added in the adder 155, and thereby, a two's complement of the constant $$\frac{ML}{M-L}$$

is obtained.

The adder 155 is also supplied with the output data of the coefficient multiplier 152. With such data input to the adder 155, its output data at the time the difference data (A−B) is positive becomes $$\frac{ML}{M-L}(A-B) - \frac{ML}{M-L},$$

and when, conversely, the difference data (A−B) is negative, becomes $$\frac{ML}{M-L}(A-B) + \frac{ML}{M-L},$$

and such output data is supplied through a line 162 to the selection circuit 156 as second input data. The third input data to the selection circuit 156 is a "0" signal on a line 163.

The absolute value circuit 160 for obtaining the absolute value |A−B| of the difference data (A−B) is formed of a parallel circuit of exclusive-ORs (EX-ORs) 157, and one input terminal of all the EX-ORs 157 is supplied with the MSB bit of the difference data (A−B). Since the MSB bit is the sign bit indicating the positive or negative polarity of the difference data (A−B), only when the difference data (A−B) is negative, the data (A−B) is inverted by the EX-ORs 157 and supplied to comparators 158, 159 as absolute value data |A−B|.

The comparators 158, 159 are supplied with constants L, M, whereby the comparators 158, 159 output a "1" signal to line 164, 165 when the absolute value data |A−B| exceeds the constants L, M, respectively.

The two signal bits on the lines 164, 165 are supplied to the selection circuit 156 as its selection signals, whereby one of the first to third input data is selected and output to a line 170.

The first input data is output to the line 170 when the selection signals are both "1", the third input data is output to the line 170 when the selection signals are both "0", and the second input data is output to the line 170 when the selection signal on the line 164 is "1" and the selection signal on the line 165 is "0".

Thus, it is known that the data output to the line 170 are just the data expressed by the characteristic shown in FIG. 14.

Incidentally, if the coefficient ML/(M−L) is established as a power of 2, the coefficient multiplier 152 can be simply provided by a shift register.

Further, the constants M, L may be made to be such functions of A, B as M=M(A, B), L=L(A, B). In such case, the decision whether a correlation is existent or nonexistent can be made not only by the absolute value of |A−B| but also by the magnitude of the ratio of $$\frac{|A-B|}{A} \text{ or } \frac{|A-B|}{B}.$$

Although the above described embodiments are such that the present invention is applied to a processing system of color difference signals R−Y, B−Y, it is of course possible to apply the same to other video signal processing systems in which similar problems are involved.

What is claimed is:

1. Apparatus for reproducing a color video signal from a recording medium on which a luminance component is recorded in a first channel and at least two chrominance component signals are recorded in a second channel such that the chrominance signals are time compressed and successively recorded in a cyclically repeated fashion, the apparatus comprising:

time expanding means supplied with reproduced chrominance signals for time expanding said reproduced chrominance signals to generate first and second time expanded chrominance signals; and a pair of signal processing means supplied with said first and second chrominance signals, respectively, each of said signal processing means including:

delay means for delaying an input chrominance signal by a horizontal interval to provide a delayed chrominance signal;

adder means for adding said input chrominance signal and said delayed chrominance signal to provide an added output;

correlation detecting means for detecting a correlation between said input chrominance signal and said delayed chrominance signal and providing a correlation output;

level detecting means for detecting a level of said input chrominance signal and generating a first output when the level of said input chrominance signal is higher than a reference level and generating a second output when the level of said input chrominance signal is lower than said reference level; and signal generating means controlled by the correlation output from said correlation detecting means and the first and second outputs of said level detecting means for generating an output signal equal to said input chrominance signal when said level detecting means generates the second output and when said level detecting means generates the first output and said correlation detecting means detects a smaller correlation, and generating an output signal equal to an average level of said input chrominance signal and said delayed chrominance signal when said level detecting means generates the first output and said correlation detecting means detects a larger correlation.

2. Apparatus according to claim 1, wherein said correlation detecting means includes subtracting means for subtracting said delayed chrominance signal from said input chrominance signal and providing an output.

3. Apparatus according to claim 1, wherein said correlation detecting means includes dividing means for dividing said delayed chrominance signal by said input chrominance signal.

4. Apparatus according to claim 1, wherein said chrominance signal is a digital signal having at least high-order bits and said delay means is a digital shift register.

5. Apparatus according to claim 4, wherein said level detecting means detects a predetermined number of the high-order bits of said chrominance signal.

6. Apparatus according to claim 2, wherein said correlation detecting means further includes a correlation detector receiving the output of said subtracting means for producing said correlation output when said output from said subtracting means falls within a predetermined range and said signal generating means includes second adder means for adding the output of said adder means and said correlation ouput.

7. Apparatus according to claim 6, wherein said correlation output is equal to zero when the output of said subtracting means has an absolute value that is less than a first value, said correlation output is equal to the output of said subtracting means when the absolute value of the output of said subtracting means is larger than a second value which is larger than said first value, and said correlation output is a linear function when the absolute value of the output of said subtracting means is between said first and said second values.

* * * * *